March 30, 1965 R. J. MIHALIK 3,175,641
MOBILE LADDERS
Filed June 19, 1963 3 Sheets-Sheet 1
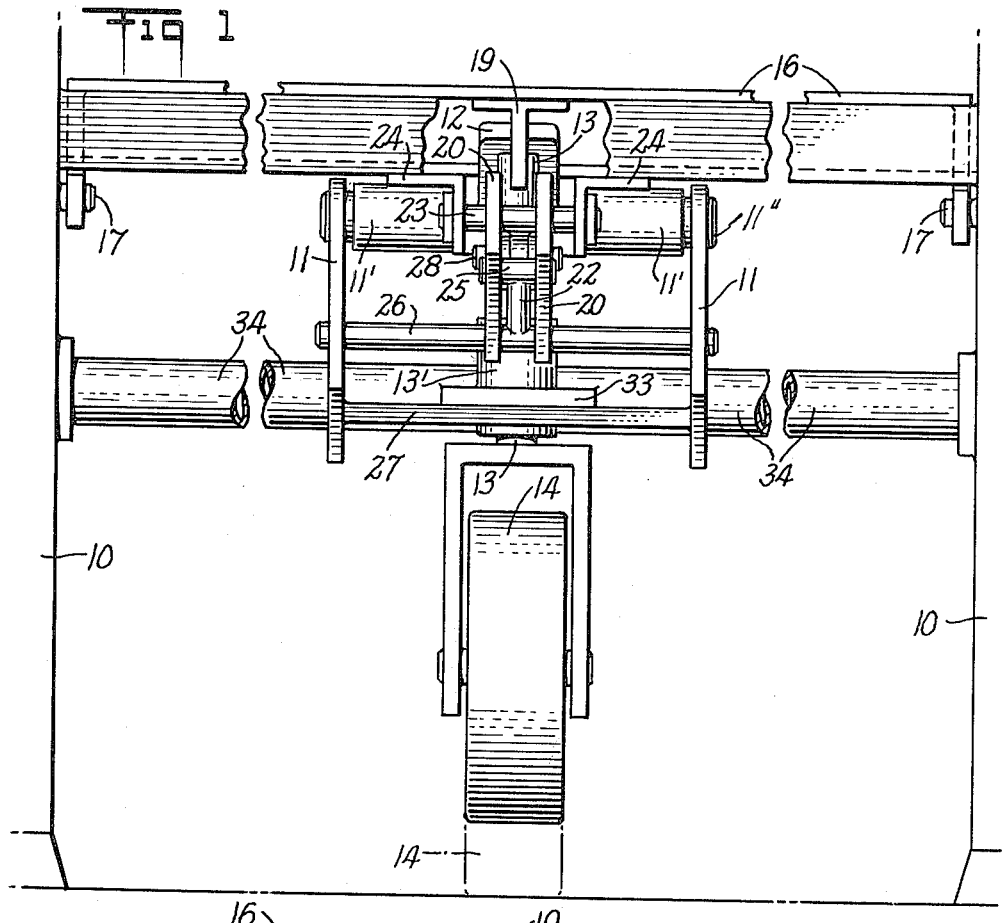
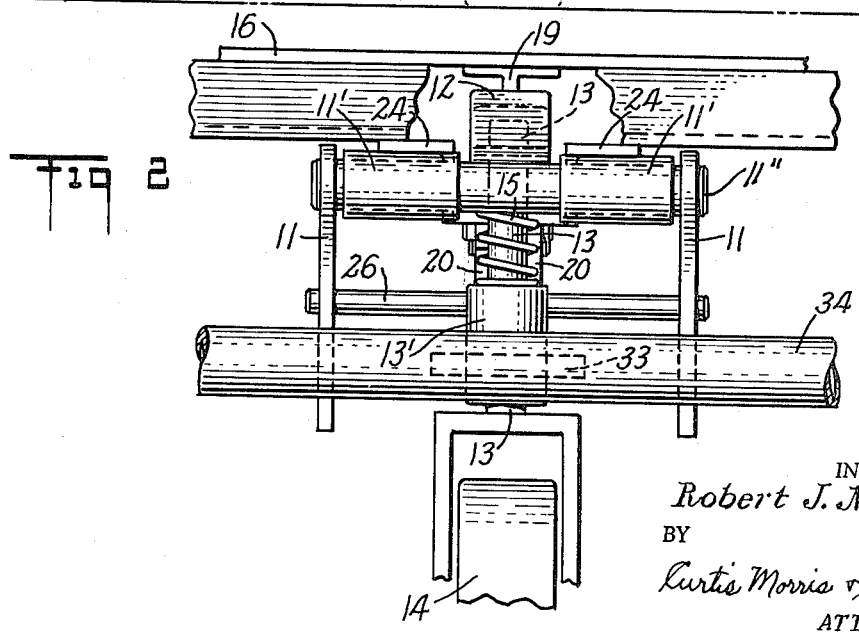
INVENTOR.
Robert J. Mihalik
BY
Curtis Morris & Safford
ATTORNEYS March 30, 1965
R. J. MIHALIK
3,175,641
MOBILE LADDERS
Filed June 19, 1963
3 Sheets-Sheet 2
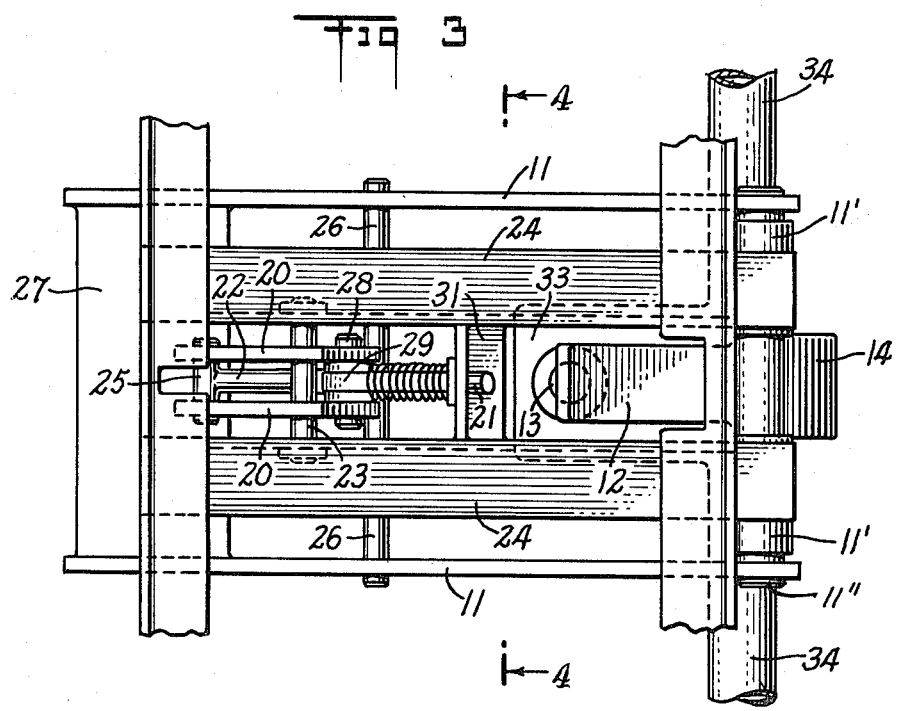
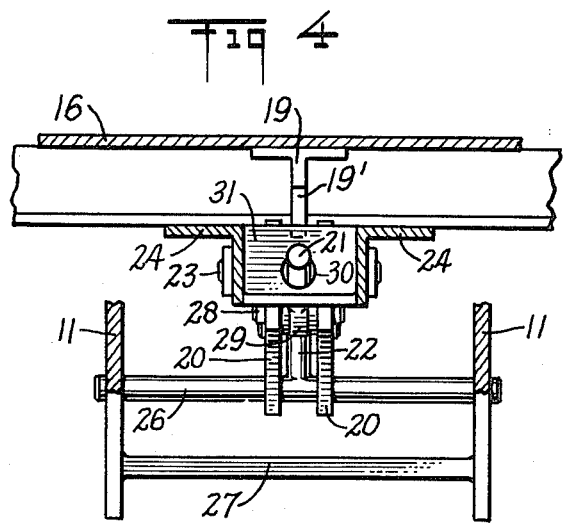
INVENTOR.
Robert J. Mihalik
BY
Curtis Morris + Safford
ATTORNEYS

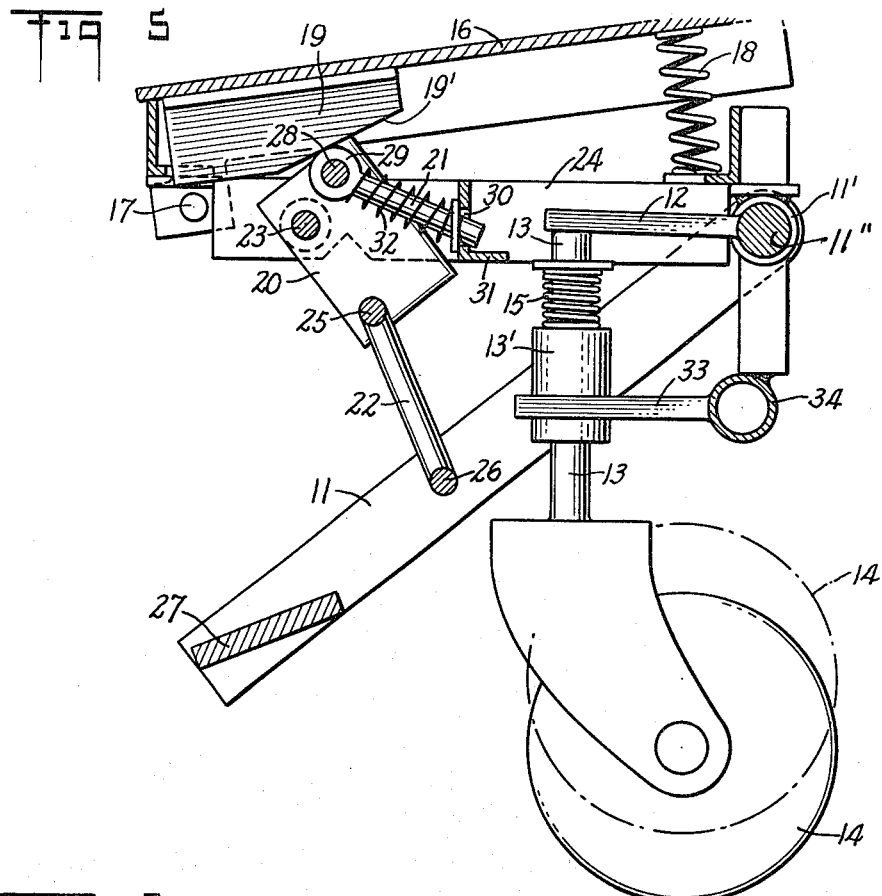
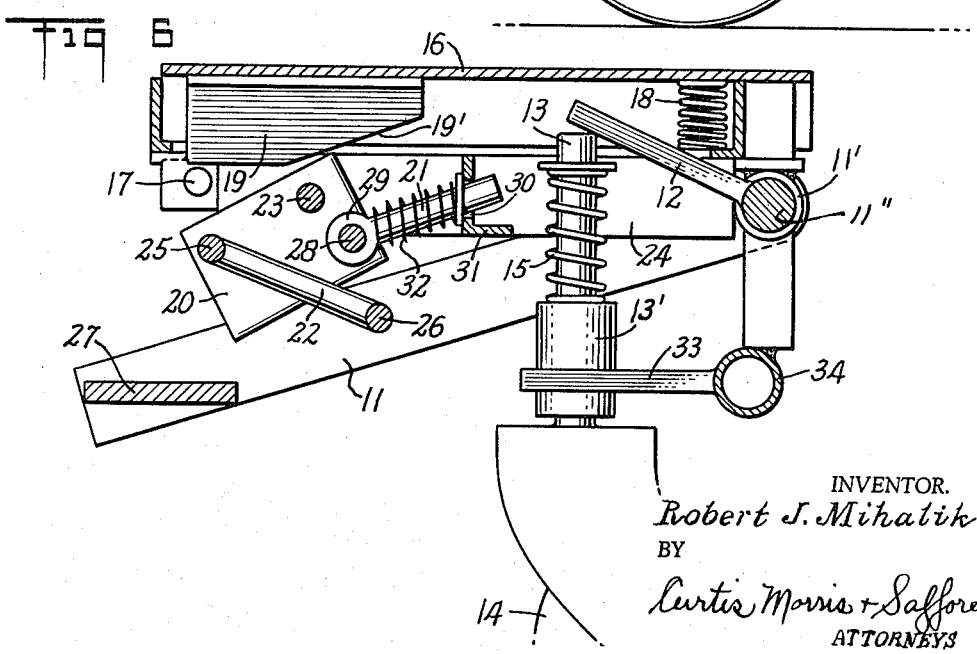

United States Patent Office 3,175,641
Patented Mar. 30, 1965

3,175,641
MOBILE LADDERS
Robert J. Mihalik, Uniontown, Pa., assignor, by mesne assignments, to Harsco Corporation, a corporation of Delaware
Filed June 19, 1963, Ser. No. 289,034
2 Claims. (Cl. 182—15)

The present invention relates to mobile ladders. Known types of such ladders include in general a frame mounted on casters, or the like, and a ladder supported in operative position on and extending upwardly and rearwardly at an angle from a front end portion of the frame. The frame also carries at its front end a pair of spaced legs one being arranged adjacent to each of the two casters which support said front end when the apparatus is being moved from place to place. Means are provided for automatically shifting the frame support from said front end casters to said legs and thus immobilizing the unit when the operator mounts the lowermost step, or equivalent element, of the ladder and for restoring the unit to mobile condition by hand or foot actuated devices. Examples of ladder units of this type are described in U.S. Patent Nos. 2,897,910 and 2,798,652.

An object of the present invention has been to provide in mobile ladders of the kind above mentioned means by which the apparatus after automatic adjustment to immobile condition, is most effectively locked in that condition; and release to mobile condition requires affirmative actuation by the operator thus reducing the likelihood of accidental release with the attendant dangers of uncontrolled movement of the unit.

A further object has been to provide simple and reliable locking means which can be readily incorporated in or mounted on a conventional or other frame structure wherein two of the legs, as those at the front end are, in effect, fixed or integral parts of the frame.

A further object has been to provide effective locking means which can be mounted between said front frame legs in position to cooperate with a single caster also mounted between said legs thus simplifying the unit and providing a more readily steerable ladder unit when in mobile condition.

In general, the present invention is embodied in a mobile ladder unit or assembly comprising a frame having spaced fixed legs, a ladder having one edge of a lower step pivoted and the opposite edge spring cushioned on the frame, a caster mounted on the frame below said step substantially midway between said legs, said caster having a vertically slidable stem spring biased upwardly toward said step, a bell crank pivoted on the frame and including a long arm and a short arm, said short arm being arranged with a free end portion bearing on the top end of said stem, a cam on the step, a rocker link pivoted eccentrically on the frame in position to be rocked by said cam, a second link pivotally connecting said rocker link and a midportion of said long arm, a toggle rod pivoted at one end to said rocker link, a toggle rod guide which provides a bearing wherein free end portions of said rod are arranged to slide longitudinally with rocking movement of said rocker link and said rod, a compression spring between said guide and the pivoted end of said toggle rod arranged and adapted to bias the rocker link in one angular position when the caster is in raised position and to bias the rocker link in a different angular position when the caster is in lowered position in relation to the frame.

Other objects and distinctive features of the present invention not above referred to will appear from the following specification and claims and from the accompanying drawings wherein is shown a preferred embodiment thereof as decribed in said specification. The showing so made is not intended to be either exhaustive or as limiting the scope of the subject invention. The purpose here is to illustrate the invention so that others skilled in the art may so fully understand it, its principles and applications, that they may embody it and adapt it in any of various forms appropriate to the attainment of any particular or appropriate purpose in use.

In said drawings:

FIG. 1 is a fragmentary view in front elevation with parts being broken away and showing the caster actuating and locking mechanism applied to a mobile ladder unit or assembly with the caster locked in up position;

FIG. 2, a rear elevation of the mechanism shown in FIG. 1 and with parts broken away and other parts shown partly in transverse vertical section;

FIG. 3, a top plan view of the mechanism above referred to and with the lower step of the ladder removed;

FIG. 4, a fragmentary view on the line 4—4 of FIG. 3, and with parts broken away and parts shown in transverse vertical section;

FIG. 5, a side elevation partly in vertical section and with parts broken away showing the relative positions of the step and locking devices with the caster locked in down position and with the rear edge of the lower ladder step spring pressed to its upper position, as when the ladder assembly is in mobile condition; and FIG. 6 is a similar view of the parts shown in FIG. 5 but with the caster locked in up position, as in FIG. 1 and when the ladder assembly is immobilized for use, and with the rear edge of the lower ladder step temporarily in down position as when downward pressure is being applied thereto.

Referring to the drawings, FIGURES 1 and 2 illustrate a portion of a ladder assembly wherein the front end of a rigid frame is provided with spaced supporting legs 10. As seen in FIGS. 5 and 6, a bell crank having a long arm 11 and a short arm 12 is mounted in the frame with a free end portion of short arm 12 bearing on the upper end of stem 13 of caster 14, said stem being biased upwardly by sping 15. The parts above identified are essentially included in certain inventions of Arthur C. Borgman heretofore disclosed in his pending application Serial No. 144,183 filed Oct. 10, 1961.

As seen in FIGS. 1, 5 and 6, the front edge of a step 16 which may be or serve as the lowermost step of a suitable ladder (not shown) mounted in a known manner on said frame, is pivoted on pintles 17 conveniently provided at the front end of the frame. Rear edge portions of said step are cushioned on springs 18 interposed between the frame and under surface portions of the step. Thus when the ladder assembly is in mobile condition, or when pressure is absent from said step 16, rear edge portions of said step are spring biased upwardly to the position shown in FIG. 5.

For the purposes of the present invention, said bellcrank comprising arms 11 and 12 secured on a shaft 11" is conveniently mounted with said shaft journaled in bearings provided by laterally spaced collars 11' secured to the frame, FIGS. 1 and 2; and the stem 13 of caster 14 is mounted to rotate in a sleeve 13' supported on a bracket 33 carried by a cross rod 34 of the frame.

In normal use of this ladder assembly, when an operator's weight comes on step 16 with the parts arranged as in FIG. 5, the step swings clockwise on pintles 17 to its FIG. 6 position; and long arm 11 of the bell crank simultaneously swings clockwise from its FIG. 5 to its FIG. 6 position. As soon as the operator's weight is lifted or removed from step 16, springs 18 promptly restore said step to the FIG. 5 position, leaving caster 14, however, locked in up position where it remains until released as hereinafter described.

Lock actuating means for the purposes above indicated include a cam 19 projecting downwardly from an under surface portion of step 16 and presenting a cam face 19'. Said cam 19 cooperates with locking devices including a toggle link assembly which comprises a rocker link 20, a toggle rod 21 and a connecting link 22 which pivotally connects rocker link 20 with an intermediate portion of long arm 11.

As appears more clearly in FIGS. 1 and 3, the rocker link 20 includes spaced side members pivoted on shaft 23 which is supported at its ends between angles 24 of the frame. The connecting link 22, FIGS. 3 and 5, has one end secured to a midportion of a shaft 25, journaled in said rocker link 20, its other end being secured to rod 26 which has its ends journaled in the long arms 11. A pedal 27 is mounted between free end portions of said long arms 11.

The toggle rod 21 includes at one end a head 29 journaled on shaft 28 and having a portion of its periphery formed with a cylindrical or rounded surface which, when the parts are arranged as in FIG. 5, is in position to be engaged by cam face 19'. Thus, when the rear edge of said step 16 and said cam 19 thereon are pressed down, cam face 19' slides on said peripheral rounded surface of the head 29 of rod 21; and toggle rod 21 is moved endwise first in one direction against pressure of spring 32 and then in the opposite direction by said spring and is simultaneously deflected counterclockwise as rocker link 20 swings clockwise on pivot 23 under pressure from cam 19. This combined endwise and rocking movement of said toggle rod 21 is controlled in part by a guide bearing 30 conveniently provided by a cylindrical hole in a transverse channel 31 and in part by said compression spring 32 embracing the shank of toggle rod 21 between said channel 31 and the head 29.

In operation, assuming that the caster is locked in up or immobile condition, FIGS. 1 and 6, with the bottom ends of legs 10 resting on the floor, adjustment or release of the assembly to mobile condition is effected by pressing down on pedal 27. This causes short arm 12 of the bell crank initially to depress stem 13 against resistance of spring 15 until caster 14 comes into engagement with the floor. With further deflection of pedal 27 and the bell crank and with short arm 12 now fulcrumed on the top end of stem 13, long arm 11 is caused to swing counter-clockwise or in a direction and into a position, FIG. 5, to lift cross shaft 11", collars 11' and thereby the front end of the frame sufficiently to raise the legs 10 out of contact with the floor.

When pedal 27 and the bell crank are actuated in the manner and to the extent as above described, the toggle link 20 and the connecting link 22 are deflected until the pivot connection 25 between them is brought to a position at one side (right, FIG. 5) of a line connecting pivots 23 and 26. Spring 32 now yieldingly retains link 20 and consequently link 22 in this position thereby, in effect, releasably locking caster 14 in rolling contact with the floor until weight is again applied on step 16. Thus, reversing the operation, downward pressure on step 16, as previously noted, causes link 20 to swing on pivot 23. This brings pivot connection 25 to the left (FIG. 6) of said line between pivots 23 and 26 whereupon the last described lock provided by the described toggle and link arrangement for maintaining caster 14 in down position is released; legs 10 drop into contact with the floor; spring 15 presses stem 13 and caster 14 upwardly to FIG. 6 position; and spring 32 presses against link 20 to releasably lock the caster in up position so that the ladder assembly is now effectively immobilized.

I claim:
1. In a mobile ladder assembly embodying a frame having spaced fixed legs, a ladder having a lower step of which one edge is pivoted and the opposite edge is spring cushioned on said frame, a caster mounted on said frame at a level below said step and having a vertically slidable stem spring biased toward up position, and a bell crank pivoted on the frame and comprising a long arm and a short arm operatively associated with said stem, the combination including a cam extending downwardly from said step, a rocker link pivoted eccentrically on the frame in position to be rocked by said cam when downward pressure is applied to said step, a second link pivotally connecting said rocker link with a midportion of said long arm, a toggle rod pivoted at one end to said rocker link, a compression spring operatively mounted on said rod between the pivotal connection thereof with said rocker link and a portion of the frame and arranged and adapted to bias the rocker link toward one angular position when the caster is in raised position and to bias the rocker link toward a different angular position when the caster is in down position.

2. Mobile ladder assembly according to claim 1 and wherein said rocker link comprises laterally spaced side members, and the pivoted end of said toggle rod includes a peripherally rounded surface portion arranged between said side members in position to be engaged by said cam when downward pressure is applied to said step and thereby effect said rocking movement of the rocker link.

References Cited in the file of this patent
UNITED STATES PATENTS

| | | |
|---|---|---|
| 2,798,652 | Easton | July 9, 1957 |
| 2,923,373 | Ledgerwood | Feb. 2, 1960 |
| 3,112,010 | Mihalik | Nov. 26, 1963 |